Dec. 25, 1962  W. E. FOLKERTS  3,070,072
POWER STEERING GEAR
Filed Jan. 16, 1961  3 Sheets-Sheet 1

INVENTOR.
Walter E. Folkerts.
BY Harness & Harris
ATTORNEYS

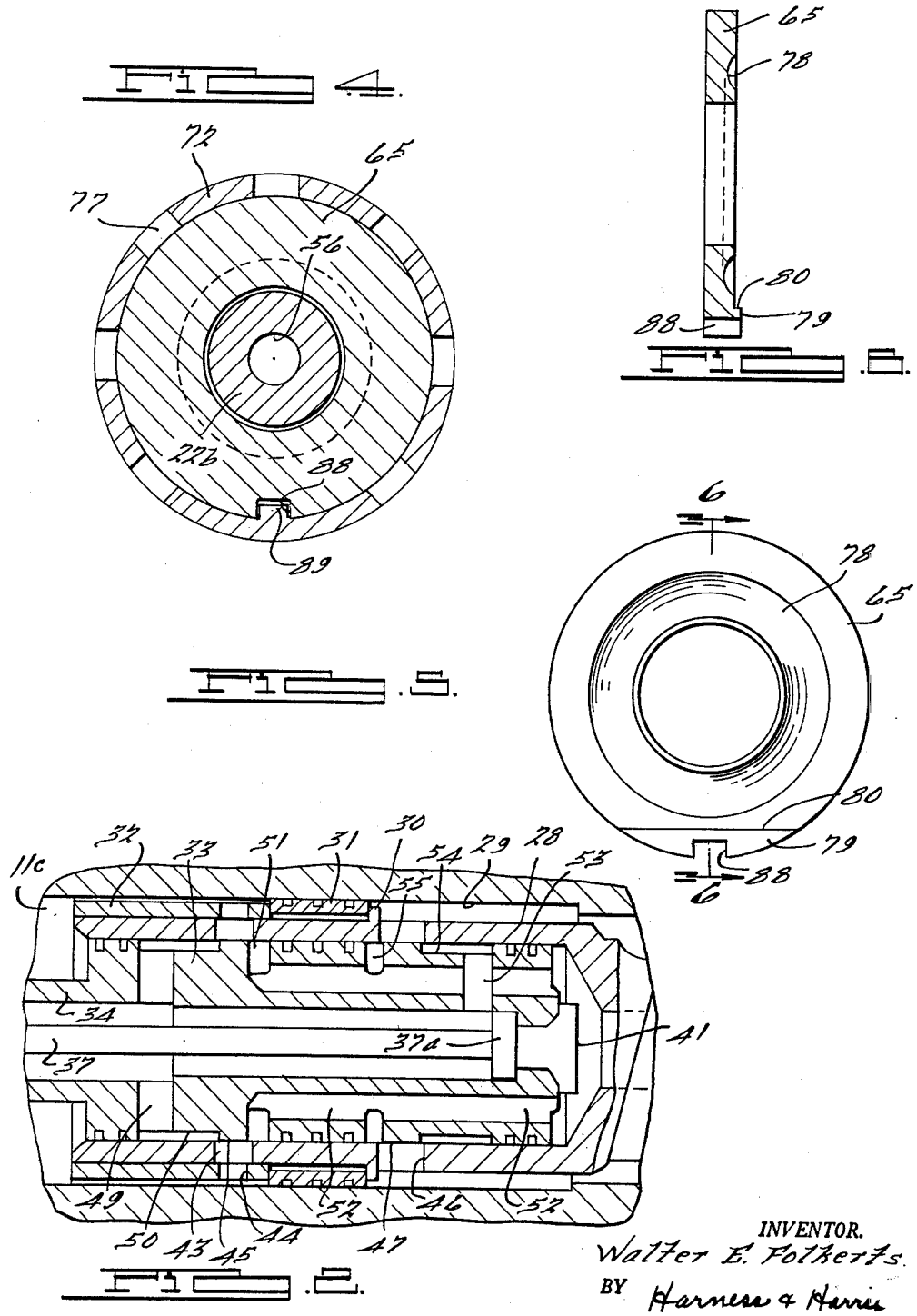

Dec. 25, 1962 W. E. FOLKERTS 3,070,072
POWER STEERING GEAR
Filed Jan. 16, 1961 3 Sheets-Sheet 3
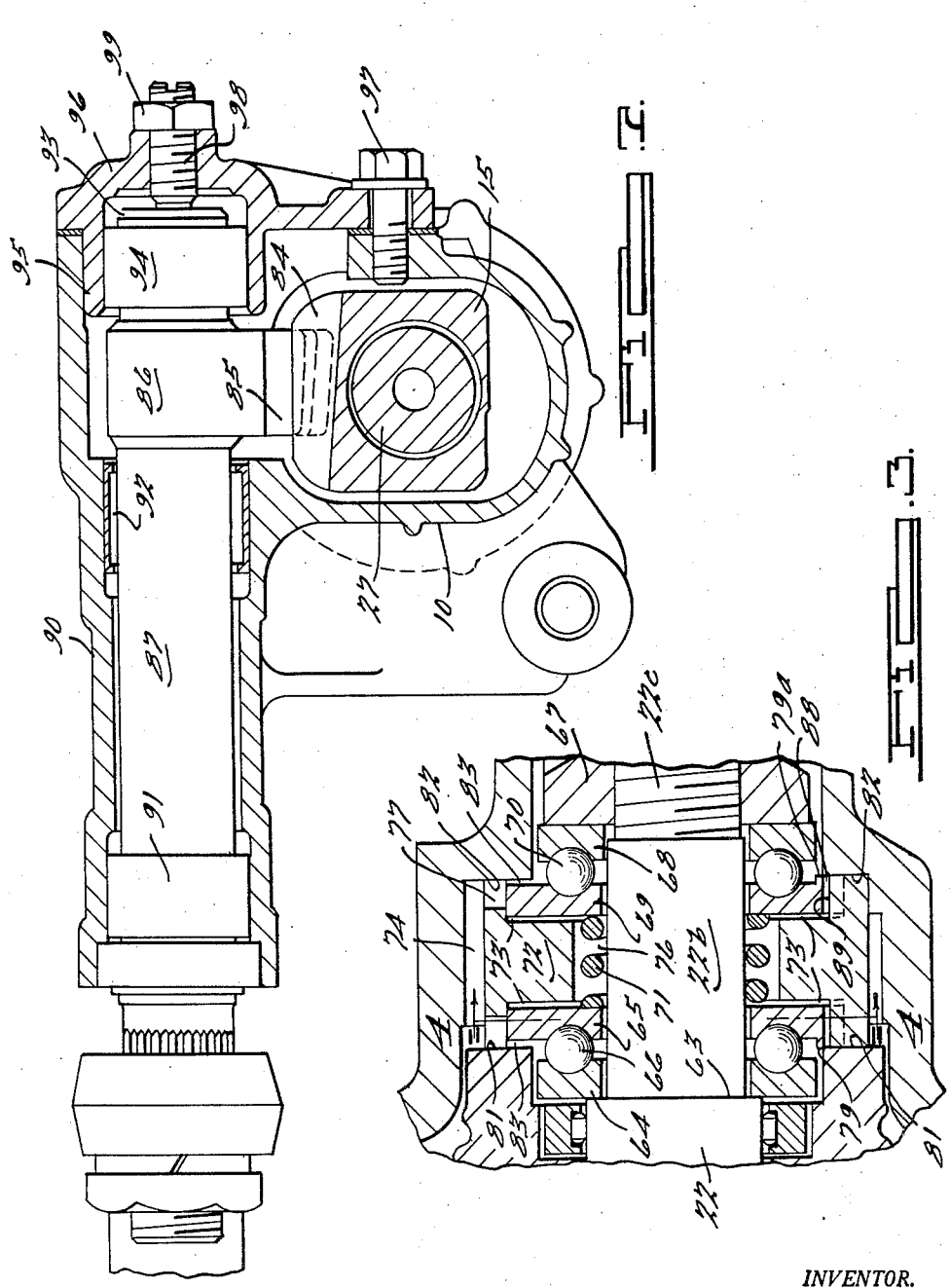
INVENTOR.
Walter E. Folkerts
BY Harness & Harris
ATTORNEYS.

United States Patent Office 3,070,072
Patented Dec. 25, 1962

3,070,072
POWER STEERING GEAR
Walter E. Folkerts, Hazel Park, Mich., assignor to Chrysler Corporation, Highland Park, Mich., a corporation of Delaware
Filed Jan. 16, 1961, Ser. No. 83,053
10 Claims. (Cl. 121—41)

This invention relates to improvements in a power steering gear for an automotive vehicle and has for a principal object the provision of an improved fluid valve means for a hydraulically actuated steering gear.

Another object is to provide an improved simple, compact, and economically fabricated gear of the above character which is characterized by the simplicity of its porting requirements, the use of a minimum number of fluid seals and external leak points, and the superiority of its operating efficiency and responsiveness to manual steering control.

Another object is to provide such a gear comprising a worm shaft in mutually driving engagement with a fluid pressure actuated piston, wherein the flow of pressurized fluid employed to actuate the piston is readily directed through the body of the worm and valve mechanism without recourse to complicated valving, thereby to achieve inexpensive means for cooling the pressurized fluid.

Other objects are to provide such a gear wherein the control valve for the pressurized fluid is buried in the body of the gear so that noise of the valve operation is damped, and wherein the worm shaft comprises the moving part of the valve, so that a comparatively high inertia valve means is achieved having a minimum tendency to oscillate or "honk." Also by virtue of the improved stability of the valve, the usual back pressure valve previously required for the exhaust fluid to minimize valve noise is rendered unnecessary.

Still another object is to provide an improved valve means for a power steering gear wherein the movable portion of the valve means is inherently subject to the natural reaction pressure employed to power the steering movement without the requirement of special reaction chambers or parts, thereby to effect a manual steering "feel" of the road resistance to the steering force without additional cost for parts or assembly.

Other objects of this invention will appear in the following description and appended claims, reference being had to the accompanying drawings forming a part of this specification wherein like reference characters designate corresponding parts in the several views.

FIGURE 2 is an enlarged sectional view of the valve and porting means in the neutral straight ahead steering position, as in FIGURE 1.

FIGURE 3 is an enlarged sectional view of the resilient reaction mechanism rotated 90° from the view illustrated in FIGURE 1.

FIGURE 4 is an enlarged sectional view taken in the direction of the arrows substantially along the line 4—4 of FIGURE 3.

FIGURE 5 is an elevational view of the inner bearing race taken from the right in FIGURE 4.

FIGURE 6 is a sectional view taken in the direction of the arrows substantially along the line 6—6 of FIGURE 5.

FIGURE 7 is a mid-sectional view longitudinally of the rockshaft of the steering gear of FIGURE 1.

Figure 1:
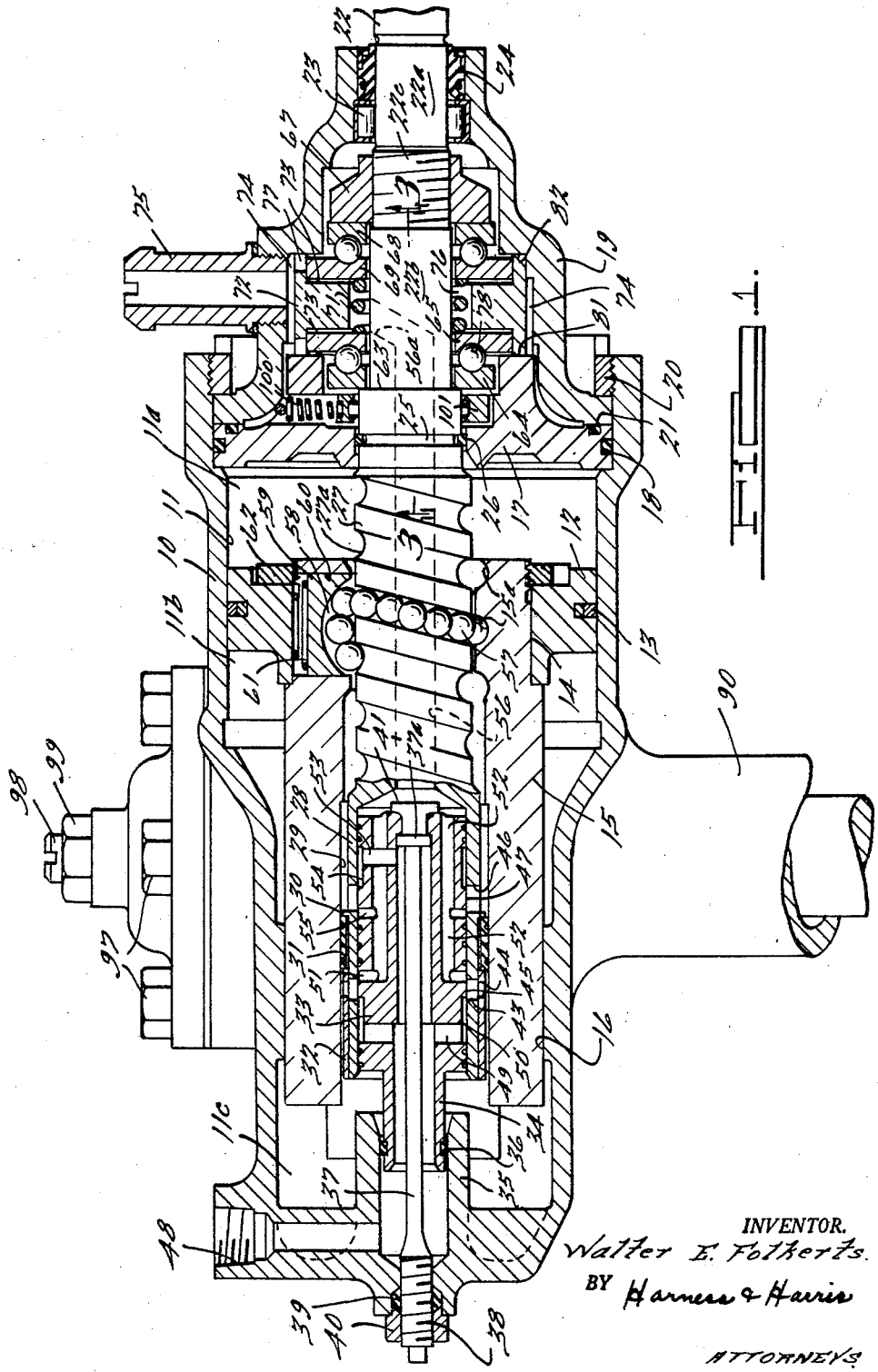
FIGURE 1 is a mid-sectional view longitudinally of the worm shaft of a steering gear embodying the present invention, looking upward in FIGURE 2.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a steering gear for an automotive vehicle is illustrated by way of example comprising a hollow housing 10 having an inner cylindrical portion 11 containing a reciprocable annular piston element 12. A peripheral seal 13 carried by the piston element 12 in sliding contact with the inner wall of the cylindrical portion 11 provides a fluid tight seal between the latter and piston element 12 to partition the portion 11 into two parts 11a and 11b. The piston element 12 is suitably secured coaxially to the reduced end 14 of a tubular piston shaft or extension 15 which extends within the housing 10 and engages side wall portion 16 thereof in guided relationship. The right end of cylinder 11 is closed in part by an annular closure plate 17 provided with a seal around its outer periphery in sealing contact with the interior of housing 10. A housing extension 19 has an inner portion engaging closure plate 17 within housing 10 and is secured therein by a nut 20. A suitable seal 21 is provided between juxtaposed portions of the plate 17 and extension 19 to prevent endwise leakage of fluid between these members.

Mounted within the housing extension 19 coaxially with cylinder 11 is a manually rotatable shaft 22 having a reduced end portion 22a journalled by means of a roller bearing 23 carried by housing extension 19. Outwardly of the bearing 23 is a suitable seal 24. The shaft 22 extends coaxially through the central opening of closure plate 17 and is formed with an annular groove containing a suitable seal 26 in sliding engagement with the inner circumference of the plate 17 to effect an annular fluid seal between the latter and shaft 22 entirely around the same. Integral with shaft 22 is a helical worm portion 27 which extends coaxially into the bore of piston shaft 15 and terminates in a tubular extension 28. At the region of the extension 28, the bore of tubular shaft 15 comprises an enlarged cylindrical bearing portion 29 which contains a radial projection or stop 30 integral with extension 28. An annular sliding seal 31 abuts the stop 30 and is confined snugly thereagainst by an annular retainer 32 suitably secured on the left end of extension 28, as for example by means of a pressed fit thereon. Seal 31 effects an annular fluid seal between the interior bearing surface 29 and extension 28 entirely around the latter.

Extending coaxially within the tubular extension 28 is a fixed tubular valve spool 33 having outer peripheral portions in sliding sealing engagement with the inner periphery of the extension 28. A leftward tubular extension 34 of the body of valve 33 projects into a tubular chamber 35 formed in the housing 10. An annular seal 36 between the extension 34 and interior of chamber 35 prevents fluid leakage from the latter axially along the exterior of the extension 34. A valve retaining rod 37 having a screw end 38 adjustably secured within housing 10 extends coaxially into the bore of spool valve 33. A suitable seal 39 prevents endwise leakage of fluid from chamber 35 and is retained in place by a lock nut 40 screwed on the threaded end 38 tightly against the housing 10 so as to lock the rod 37 in an adjusted position. Adjacent the right end of rod 37 is an annular enlargement 37a which abuts a radially inwardly directed shoulder of the spool 33. The right end of shaft 37 is peened snugly against the right end of valve spool 33 to confine a portion of the latter against the enlargement 37a and to provide a fluid tight seal with valve 33 entirely around the right end of shaft 37.

To the left of the mid-region of tubular extension 28, the latter is provided with a plurality of circumferentially extending working ports 43 opening radially into another plurality of circumferentially extending ports 44 formed in the retainer 32. The ports 43 and 44 extend circumferentially sufficient distances so that some portions of these ports will be in communication with each other regardless of the position of angular adjustment of the retainer 32 on extension 28. A valve land 45 of the spool 33 is aligned midway between the axial end walls of the ports 43 when the steering gear is in a neutral position for straight ahead steering, FIGURES 1 and 2. To the right of the ports 43, the extension 28 is provided with a plurality of circumferentially extending working ports 46 aligned axially with an annular valve land 47 of spool 33 when the steering gear is in the neutral condition. In this regard, the axial dimension of the lands 45 and 47 is slightly less than the corresponding axial dimension of the ports 43 and 46, so that in the neutral condition fluid can bypass these lands as described more fully below.

The housing 10 is provided with a fluid inlet 48 in communication with the interior of chamber 35, from which fluid is directed through the central bore of extension 34 and integral valve 33 to a plurality of radial left turn ducts 49 in valve 33 which extend to the exterior of the latter at the region of a portion 50 thereof of reduced diameter. Leftward of the reduced portion 50, the spool valve 33 is in sliding sealing contact with the interior of extension 28 entirely around the spool 33. The right edge of reduced portion 50 terminates at land 45, so that when the valve 33 is in the neutral position shown, fluid under pressure in the space between reduced portion 50 and extension 28 will flow into port 43 and thence into a plurality of radial exhaust ports 51 in spool 33. Radial ports 51 communicate with a number of axial exhaust ducts 52 in spool 33, which open at the right end of spool 33.

In addition when the valve 33 is at the neutral condition, the fluid within its central bore is directed outwardly through a plurality of radially extending right turn ports 53 which extend in spool 33 to the latter's outer surface at the region of a portion 54 thereof of reduced diameter. Accordingly the fluid in the space between the reduced portion 54 and extension 28 is conducted into port 46 and thence to a plurality of radially extending exhaust ports 55 in spool 33, which communicate with the exhaust ducts 52. Accordingly when the valve 33 is in the neutral position, both working ports 43 and 46 are in communication with exhaust ducts 52. The ducts 52 open at the right of valve 33 into the space between the latter and the base of the tubular extension 28, which space is connected to exhaust as described below by means of an exhaust conduit 56 extending coaxially through worm 27. Rightward of the reduced portion 54, and also between exhaust ports 51 and 55, the spool valve 33 is in sliding sealing contact with the interior of extension 28 entirely around spool 33.

A mechanical connection between piston 12, 15 and worm shaft 27 is provided by means of a plurality of recirculating balls 57 riding within mating helical grooves 27a in the worm 27 and 15a in the interior surface at the right end of piston extension 15. Continuous recirculation of the balls 57 within the aforesaid mating grooves is enabled by means of a ball crossover path 58 formed in a crossover member 59 so as to carry the balls 57 over a land of the worm shaft 27. The crossover member 59 is confined within a recess 60 at the right end of piston shaft 15 and is yieldingly urged toward worm 27 by means of a spring 61 under compression between the member 59 and the inner wall of the annular piston element 12. A retaining nut 62 screwed on a threaded right end portion of shaft 15 holds the crossover member 59 in position.

Slightly to the right of the sealing groove 25 in manually rotatable shaft 22, the latter is provided with a radially reduced portion 22b to effect an annular shoulder 63.

An annular outer bearing race 64 is seated against shoulder 63 and cooperates with an annular inner bearing race 65 to confine a plurality of ball bearings 66 therebetween around the shaft portion 22b, FIGURE 3. The right end of reduced portion 22b is threaded at 22c for a retaining nut 67 which abuts an annular outer bearing race 68. The latter cooperates with an annular inner bearing race 69 to confine a plurality of ball bearings therebetween around the shaft portion 22b, FIGURE 3. The paired inner races 65 and 69 are maintained in axially spaced relationship by means of a reaction spring 71 coiled around shaft portion 22b.

An annular spacer and movement limiting ring 72 of T-shaped cross section extends coaxially around the shaft 22 with its inner portion comprising the leg of the T extending between the inner races 65 and 69 and spaced therefrom to provide a lost motion clearance 73 of approximately .020 inch. The rim of the member 72 overlaps and extends closely around the outer peripheral edges of the bearing races 65 and 69 and is spaced from the inner wall of housing portion 19 to provide an annular exhaust chamber 74 in communication with an exhaust fitting 75 connected with a fluid return line for returning hydraulic fluid either to a reservoir or to the inlet of a pump which supplies pressurized fluid to the high pressure inlet 48.

The inner circumference of the spacer 72 extends around the spring 71 in spaced relationship therewith and with the shaft portion 22b to provide an annular chamber 76 in communication with an angularly extending bore 56a in the shaft portion 22b and connected with the right end of bore 56. Accordingly exhaust fluid from valve 33 is conducted through bore 56 and bore 56a to annular chamber 76, then axially through the clearance between shaft portion 22b and the inner circumferences of the races 65 and 69, radially outwardly between the balls 66 and 70 in the spaces between the paired races 64, 65 and 68, 69, radially through an alignment clearance 83 (described below) between juxtaposed portions of race 65 and a shoulder 81 of closure plate 17, and also between juxtaposed portions of race 69 and a shoulder 82 of housing portion 19, then through a plurality of circumferentially spaced slots 77 formed in the axially opposite edges of the rim of spacer 72, and then into the annular exhaust chamber 74 and exhaust fitting 75. The foregoing fluid exhaust flow path provides an economical path for exhausting fluid through the various clearances inherent in the steering reaction mechanism. In FIGURE 1, the upper portion of the section through spacer 72 is through one of the slots 77, but the lower portion of the section is off-set from the diameter containing the upper portion and extends through a portion of the rim of spacer 72 between two slots 77.

Referring in more particularity to FIGURES 4, 5, and 6, details of bearing race 65 are illustrated. Bearing race 69 is a mirror image of race 65 and is accordingly not illustrated in detail. The race 65 is provided with an annular groove 78 of circular cross section which mates with a corresponding groove in race 64 to carry the plurality of ball bearings 66. Radially outward of the groove 78, the surface of the race 65 containing the groove 78 is provided with an axially offset flat or segmental surface 79 offset by the axial dimension of a shoulder 80 amounting to approximately .005 inch. The race 65 is preferably formed from a bearing race having an initial axial thickness of the segment 79, which is then ground over the area of the major segment at the low side of shoulder 80 to a uniform axial thickness amounting to approximately .005 inch. less than the thickness of the segment 79.

Prior to assembly of the housing portion 19, the bearings 64, 65 and 68, 69 are assembled around the shaft portion 22b with the spring 71 and spacer 72 interposed between the races 65 and 69 as illustrated in FIGURE 3. The nut 67 is then tightened against race 68, compressing spring 71 and urging race 64 snugly against shoulder 63 until the spacing between the offset flat segment 79 and the corresponding flat segment 79a of the race 69 equals the distance of the axial spacing between the axially opposite edges of the rim of spacer 72. The housing portion 19 is then assembled and retained in place by nut 20 so that the flat segment 79 and the left edge of the rim of spacer 72 are flush with each other and snugly abut shoulder 81 and also so that the flat segment 79a of race 69 lies flush with the right edge of the rim of spacer 72 in abutment with shoulder 82. In the assembled position of housing portion 19, the rim of spacer 72 is snugly clamped between shoulders 81 and 82 so as to prevent relative rotation of spacer 72. Also in the assembled position, the spring 71 urges the races 65 and 69 away from each other and toward the corresponding shoulders 81 and 82 so as to equalize the annular lost motion spaces 73 at opposite sides of the leg of the T-shaped spacer 72.

By virtue of the foregoing structure, an alignment clearance 83 of approximately .005 inch will exist between the races 65 and 69 and the corresponding shoulders 81 and 82 at all locations except at the regions of the offset segments 79. This clearance 83 not only provides a portion of the exhaust flow path but accommodates for misalignment or cocking of the races 65 and 69 from their coaxial relationship on worm shaft 27, particularly during assembly. Accordingly the lost motion or reaction clearance 73 at opposite sides of the T-leg of spacer 72 is determined precisely by the axial spacing between the flats 79 and 79a, rather than entirely around the circumferential portions of the races 65 and 69. Slight out-of-squareness of the axial alignment of the races 65 and 69 with respect to the spacer 72, resulting either from assembly or in consequence of cocking of shaft 22, 27 from coaxial alignment with spacer 72 during operation, is absorbed by the approximately .005 inch clearance 83 without affecting the lost motion clearance 73 and the sensitivity of the steering action as described below.

In the above regard, the flats 79 are preferably assembled in diametrical alignment with a toothed or gear rack portion 84 integral with the outer surface of piston extension 15, FIGURE 7. Rack 84 is in mesh with the teeth 85 of a sector gear 86 integral with a rockshaft 87 which extends transversely to the axis of worm 27 and is operatively connected at its outer end with a steering linkage for turning the dirigible wheels of the vehicle upon rocking of the sector gear 86. Accordingly, the road reaction to the steering force is transmitted through shaft 87 and teeth 85 to the piston rack 84, tending to force the worm 27 slightly out of its desired axial alignment as aforesaid. In order to maintain the flats 79 and 79a in the desired alignment with a diametrical plane through the axis of worm 27 and the teeth 84, 85, the races 65 and 69 are each provided with a notch 88 which receives a projecting key 89 integral with the rim of spacer 72, FIGURES 4 and 5.

The rockshaft 87 is journalled in a housing portion 90 of the housing 10 by means of axially spaced needle bearings 91 and 92. An integral extension 93 of the rockshaft 87 projects from the sector gear 86 in the opposite direction from the portion of shaft 87 which is connected with the steering linkage and is journalled by means of a needle bearing 94 supported within a cylindrical portion 95 of a housing closure 96 secured to housing portion 90 by bolts 97. An adjusting screw 98 screws into closure 96 coaxially with shaft 87 and is suitably secured to the extension 93 thereof to provide means for adjusting the play between the intermeshing tapered teeth 84 and 85. Screw 98 is maintained in its adjusted position by a lock nut 99 screwed tightly against closure 96.

By reason of the bearing support 23 at the right end of shaft 22, the latter is capable of limited swinging or cocking movement, about the bearing 23 as a fulcrum, to the limit of play resulting from operational tolerances in the supporting connection between shaft 15 and worm 27. In order to minimize this play and to apply a predetermined load on the balls 57 in the mating grooves 15a and 27a, a loading spring 100 under compression between housing extension 19 and an annular needle bearing race 101 urges the latter against the circumference of the shaft 22 in a direction diametrically away from the crossover path 58. The needle bearing race 101 is located around shaft 22 immediately to the right of seal 26 in FIGURE 1 and sufficiently to the left of bearing 23 to apply a moment of force against shaft 22 urging the worm portion 27 downward, thereby to bind or load the balls 57 in the mating grooves 15a and 27a at the region thereof diametrically opposite the crossover path 58. In consequence, play in the ball driving connection between worm 27 and piston extension 15 is minimized and the sensitivity of the power assisted steering gear to manual control is enhanced.

In operation of the steering gear described in a left turn, the manually rotatable shaft 22, which is suitably secured at its right end to a conventional steering gear, is rotated counterclockwise as viewed from the left end of FIGURE 1. By reason of the balls 57 interconnecting the mating helical grooves 15a and 27a, the left hand turning of shaft 22 imparted to the integral worm 27 exerts a steering force on piston 12, 15 tending to urge the latter rightward in FIGURE 1. This rightward movement is resisted by the road reaction to the steering force, so that worm shaft 27 instead is urged against the resistance of spring 71 leftward in FIGURE 1 to the limit permitted by the lost motion clearance 73 between bearing race 69 and spacer 72. The leftward movement of worm shaft 27 displaces the cylindrical extension 28 leftward so as to increase the opening between ports 43 and the space around the reduced surface 51. Simultaneously the communication between ports 43 and the radial exhaust ports 51 is reduced. Likewise the leftward displacement of extension 28 increases the communication between port 46 and the radial exhaust ports 55, and decreases the communication between the ports 46 and the space around the reduced surface 54.

In consequence, pressurized fluid entering the bore of valve spool 33 from the high pressure coupling 48 is directed through radial ports 49 into the space around area 50, then through ports 43 and 44 into the clearance between retainer 32 and the interior of tubular piston shaft 15, and then into the chamber portion 11c in communication with said clearance at the left of the piston shaft 15. Chamber portion 11c is in communication with the chamber portion 11b, FIGURE 7, but is blocked from communicaiton with chamber portion 11a by means of seal 31. The entire left surface area of the piston structure 12—15 is thus exposed to the high pressure fluid urging the piston structure rightward to assist the steering movement. The hydraulic fluid in the chamber portion 11a at the right surface of the piston structure 12—15 flows readily along the worm grooves 15a—27a, past the balls 57 and into the interior of tubular piston extension 15 at the right side of seal 31, then along the clearance between extensions 15 and 28 to port 46, into radial ducts 55 to exhaust conduits 52, and then through bore 56 to exhaust coupling 75 via the above described flow passages at the reaction struucture including chambers 74, 76 and notches 77.

By virtue of the seal 31 carried by extension 28, the difference in fluid pressure at the left and right sides of the piston structure is applied to the effective annular cross sectional area of the left end of extension 28, which is measured from the interior surface of the latter to the interior surface of the piston extension 15 engaged by seal 31. This fluid pressure force applied against the left end of extension 28 tends to resist leftward movement of the worm shaft 27 with a force directly proportional to the road resistance to the steering action.

During a right turn when shaft 22 is rotated clockwise as viewed from the right in FIGURE 1, the ball connection between worm 27 and piston shaft 15 tends to move the latter leftward and to move worm 27 rightward with an equal reaction force. The rightward movement of worm 27 and integral extension 28 compresses spring 71 to the limit of movement permitted by the lost motion slot 73 between bearing race 65 and spacer 72. This movement increases the communication between port 46 and the space around reduced surface 54 and simultaneously closes the communication between port 46 and the radial ports 55. In the same movement, the communication between ports 43 and the high pressure fluid in the space around the reduced surface 58 is diminished and the communication between ports 43 and the radial exhaust ports 51 is increased. Accordingly, the high pressure fluid within the bore of valve 33 is communicated by radial ducts 53 to the space around reduced surface 54, thence into radial ports 46 and to the clearance between shafts or extensions 15 and 28 to the right side of the piston structure 12—15 to effect a power assist for the steering movement. The fluid at the left side of the piston structure is discharged to the exhaust bore 56 from chamber portions 11b and 11c via the clearance between retainer 32 and extension 15, ports 44 and 43, radial exhaust ports 51 and exhaust ducts 52.

It is to be noted that the inner diameter of the opening in plate 17 through which shaft 22 extends is less than the inner diameter of extension 15 engaged by seal 31. Accordingly the pressure at the right of piston structure 12, 15 (which is also applied against the right side of seal 31 carried by extension 28) exerts a force against worm 27 resisting rightward movement of the latter with a force proportional to the road resistance to the steering movement. This force is also proportional to the unbalanced fluid pressure on worm 27 comprising the fluid pressure on the annular area between the inner circumference of the plate 17 at the seal 26 and the inner circumference of extension 15 at the seal 31. Preferably this latter area is the same as the effective area at the left end of extension 28 exposed to the pressure in chamber 11c, so that an equal steering reaction will result for any given road resistance during steering either to the right or to the left.

I claim:

1. In a vehicle steering gear, a housing defining a pressure cylinder, piston means reciprocable in and partitioning said cylinder into two parts, manually rotatable shaft means mounted in said housing for rotational and limited axial movement with respect to said housing and extending into both parts of said cylinder, means connecting said shaft and piston means for conjoint reciprocation of the latter and rotation of the former, means operative by reciprocation of said piston means to apply a steering force, said shaft means being reactive to said steering force to the extent of said limited axial movement oppositely to the direction of movement of said piston means, a valve element fixed with respect to said housing, fluid inlet and exhaust port means in said housing, portions of said element and shaft means being cooperable with said inlet and exhaust port means for selectively connecting said inlet port means with one of said cylinder parts upon axial shifting of said shaft means in one direction and for simultaneously connecting said exhaust port means with the other cylinder part, said shaft means having a reaction portion in each cylinder part, the reaction portion in the energized cylinder part being subject to the fluid pressure therein to oppose shifting of said shaft means in the direction tending to connect the energized cylinder part with said inlet port means.

2. In a vehicle steering gear, a housing defining a pressure cylinder, piston means reciprocable in and partitioning said cylinder into two parts, manually rotatable shaft means mounted in said housing for rotational and limited axial movement with respect to said housing and extending into both parts of said cylinder, means connecting said shaft and piston means for conjoint reciprocation of the latter and rotation of the former, means operative by reciprocation of said piston means to apply a steering force, said shaft means being reactive to said steering force to the extent of said limited axial movement oppositely to the direction of movement of said piston means, a valve element fixed with respect to said housing, fluid inlet and exhaust port means in said housing, portions of said element and shaft means being cooperable with said inlet and exhaust port means for selectively connecting said inlet port means with one of said cylinder parts upon axial shifting of said shaft means in one direction and for simultaneously connecting said exhaust port means with the other cylinder part, said shaft means having a reaction portion in each cylinder part, each reaction portion being in fluid sealing engagement with said piston means to prevent fluid flow between said reaction portion and piston means from the associated cylinder part, thereby to prevent application of the fluid pressure in either cylinder part of the reaction portion in the other cylinder part, the reaction portion in the energized cylinder part being subject to the fluid pressure therein to oppose shifting of said shaft means in the direction tending to connect the energized cylinder part with said inlet port means.

3. In a vehicle steering gear, a housing defining a pressure cylinder, piston means reciprocable in said cylinder, manually rotatable shaft means mounted in said housing for rotational and limited axial movement with respect to said housing, means connecting said shaft and piston means for conjoint reciprocation of the latter and rotation of the former, means operative by reciprocation of said piston means to apply a steering force, said shaft means being reactive to said steering force to the extent of said limited axial movement oppositely to the direction of movement of said piston means, a valve element fixed with respect to said housing, fluid inlet and exhaust port means in said housing, sealing means cooperable with said piston means, housing, shaft means and valve element for partitioning said cylinder into two parts confronting opposite sides respectively of said piston means, portions of said element and shaft means being cooperable with said inlet and exhaust port means for selectively connecting said inlet port means with one of said cylinder parts upon axial shifting of said shaft means in one direction and for simultaneously connecting said exhaust port means with the other cylinder part, said shaft means having a reaction portion in each cylinder part, the reaction portion in the energized cylinder part being subject to the fluid pressure therein to oppose shifting of said shaft means in the direction tending to connect the energized cylinder part with said inlet port means.

4. In a vehicle steering gear, a housing defining a pressure chamber comprising in part a cylinder, piston means reciprocable axially in said cylinder and partitioning said chamber into two parts confronting opposite faces of said piston means, said piston means having an axial opening therethrough, manually rotatable shaft means mounted in said housing for rotational and limited axial movement with respect to said housing and extending into one end of said opening, means connecting said shaft and piston means for conjoint reciprocation of the latter and rotation of the former, means operative by reciprocation of said piston means to apply a steering force, said shaft means being reactive to said steering force to the extent of said limited axial movement oppositely to the direction of movement of said piston means, a valve element fixed with respect to said housing and extending into the opposite end of said opening, one of the members comprising said valve element and shaft means being sleeved coaxially over the other, fluid inlet and exhaust port means in said housing, valving portions of said element and shaft means cooperable with said inlet and exhaust port means for selectively connecting said inlet port means with one of said chamber parts upon axial shifting of said shaft means in one direction and for simultaneously connecting said exhaust port means with the other chamber part, said shaft means having radially extending reaction surface portions in each chamber part subject to the fluid pressure therein urging said shaft means axially, the reaction surface portion in the chamber part energized by shifting of said shaft means in a given direction being subject to the fluid pressure in that chamber part to oppose said shifting.

5. The combination according to claim 4 wherein said means for selectively energizing said chamber parts include a duct extending axially within one of said members from said inlet port to said valving portions, and also include a duct extending axially within the other of said members from said valving portions to said exhaust port means.

6. In a vehicle steering gear, a housing defining a pressure chamber comprising in part a cylinder, piston means reciprocable axially in said cylinder and partitioning said chamber into two parts confronting opposite faces of said piston means, said piston means having an axial opening therethrough, manually rotatable shaft means mounted in said housing for rotational and limited axial movement with respect to said housing and extending into one end of said opening, means connecting said shaft and piston means for conjoint reciprocation of the latter and rotation of the former, means operative by reciprocation of said piston means to apply a steering force, said shaft means being reactive to said steering force to the extent of said limited axial movement oppositely to the direction of movement of said piston means, a valve element fixed with respect to said housing and extending into the opposite end of said opening, said valve element extending coaxially into a hollow end portion of said shaft means, fluid inlet and exhaust port means in said housing, valving portions of said element and shaft means cooperable with said inlet and exhaust port means for selectively connecting said inlet port means with one of said chamber parts upon axial shifting of said shaft means in one direction and for simultaneously connecting said exhaust port means with the other chamber part, a sliding seal between said shaft and piston means separating said two chamber parts, said shaft means having radially extending reaction surface portions in each chamber part subject to the fluid pressure therein urging said shaft means axially, the reaction surface portion in the chamber part energized by shifting of said shaft means in a given direction being subject to the fluid pressure in that chamber part to oppose said shifting.

7. The combination according to claim 6 wherein said means for selectively energizing said chamber parts include a duct extending axially within said valve element from said inlet port means to said valving portions, and also include a duct extending axially within said shaft means from said valving portions to said exhaust port means.

8. In a vehicle steering gear, a housing defining a pressure chamber comprising in part a cylinder, piston means reciprocable axially in said cylinder and partitioning said chamber into two parts confronting opposite faces of said piston means, said piston means having an axial opening therethrough, manually rotatable shaft means mounted in said housing for rotational and limited axial movement with respect to said housing and extending into one end of said opening, means connecting said shaft and piston means for conjoint reciprocation of the latter and rotation of the former, means operative by reciprocation of said piston means to apply a steering force, said shaft means being reactive to said steering force to the extent of said limited axial movement oppositely to the direction of movement of said piston means, a valve element fixed with respect to said housing and extending into the opposite end of said opening, one of the members comprising said valve element and shaft means being sleeved coaxially over the other, fluid inlet and exhaust port means in said housing, valving portions of said element and shaft means cooperable with said inlet and exhaust port means for selectively connecting said inlet port means with one of said chamber parts upon axial shifting of said shaft means in one direction and for simultaneously connecting said exhaust port means with the other chamber part, a sliding seal between said one member and piston means separating said two chamber parts, said shaft means having radially extending reaction surface portions in each chamber part subject to the fluid pressure therein urging said shaft means axially, the reaction surface portion in the chamber part energized by shifting of said shaft means in a given direction being subject to the fluid pressure in that chamber part to oppose said shifting.

9. In a vehicle steering gear, a housing defining a pressure chamber comprising in part a cylinder, piston means reciprocable axially in said cylinder and partitioning said chamber into two parts confronting opposite faces of said piston means, said piston means having an axial opening therethrough, manually rotatable shaft means mounted in said housing for rotational and limited axial movement with respect to said housing and extending from said housing into a first of said chamber parts and into one end of said opening, means connecting said shaft and piston means for conjoint reciprocation of the latter and rotation of the former, means operative by reciprocation of said piston means to apply a steering force, said shaft means being reactive to said steering force to the extent of said limited axial movement oppositely to the direction of movement of said piston means, a valve element fixed with respect to said housing and extending into the second of said chamber parts and into the opposite end of said opening, said valve element extending coaxially into a hollow end portion of said shaft means, fluid inlet and exhaust port means in said housing, valving portions of said element and shaft means cooperable with said inlet and exhaust port means for selectively connecting said inlet port means with one of said chamber parts upon axial shifting of said shaft means in one direction and for simultaneously connecting said exhaust port means with the other chamber part, a sliding seal around said shaft means between the latter and piston means, said seal being within said opening and separating said two chamber parts, a second sliding seal around said shaft means between the latter and housing, said second seal being exposed to the fluid pressure in said first chamber part and defining an effective diameter for said shaft means less than the effective diameter of said shaft means defined by said first named seal, thereby to effect a reaction area of said shaft means exposed to the fluid pressure in said first chamber part.

10. The combination according to claim 9 wherein said hollow end portion of said shaft means terminates in said second chamber part and is subject to the fluid pressure therein.

References Cited in the file of this patent

UNITED STATES PATENTS 2,710,596    Folkerts -------------- June 14, 1955
2,837,167    Loofbourrow ----------- June 3, 1958

UNITED STATES PATENT OFFICE
CERTIFICATE OF CORRECTION

Patent No. 3,070,072            December 25, 1962

Walter E. Folkerts

It is hereby certified that error appears in the above numbered patent requiring correction and that the said Letters Patent should read as corrected below.

Column 6, lines 46 and 47, for "communicaiton" read -- communication --; column 8, line 16, for "of" read -- to --; column 9, line 7, for "wihtin" read -- within --.

Signed and sealed this 6th day of August 1963.

(SEAL)
Attest:

ERNEST W. SWIDER            DAVID L. LADD
Attesting Officer            Commissioner of Patents